Patented Dec. 22, 1931

1,837,537

UNITED STATES PATENT OFFICE

PAUL EMERSON, OF AMES, IOWA

ARTICLE NET FOR AUTOMOBILES

Application filed October 16, 1929. Serial No. 400,058.

The object of my invention is to provide an article net for automobiles of simple, durable and comparatively inexpensive construction.

A further object is to provide a net which may be fastened to the inside of the top of an automobile or in any convenient position for supporting and carrying various articles such as small packages, maps, books, etc., in such a manner that these articles may be conveniently and easily removed or introduced into the net from any position around the periphery thereof.

Another object is to provide such a net of simple construction having no buckles, straps, springs or clamps to be hung in suspended position, the net being arranged for quick attachment or detachment from the roof of the automobile.

More particularly it is my object to provide such a net of a substantially rectangular outline with a plurality of rows of attaching devices arranged in a substantially rectangular formation for the net to be attached to the roof of the automobile in position for holding articles.

Another important object is to provide the net formed of cross cords similar to a fish net construction, the cords extending diagonally with respect to the rows of fastening devices, whereby the net can be stretched to hold bulky articles and for unfastening the peripheral edge thereof for the insertion or removal of articles to and from the net.

Still a further object is to provide a portion of the net imperforate for containing small articles which might fall through the mesh of the remaining portion of the net.

With these and other objects in view my invention consists in the construction, arrangement and combination of the various parts of my device, whereby the objects contemplated are attained, as herein after more fully set forth, pointed out in my claims, and illustrated in the accompanying drawings, in which:

Figure 1:
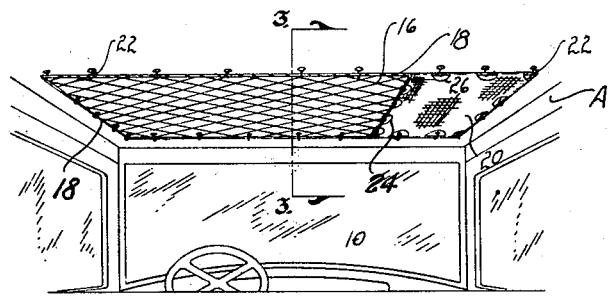
Figure 1 is an inner perspective view of an automobile looking forwardly and illustrating my improved article net attached to the roof thereof.

On the accompanying drawings I have used the reference character A to indicate generally an automobile. The wind shield of the automobile is indicated at 10, the inside roof covering thereof at 12 and frame members of the roof at 14.

My article net consists of a plurality of crossed cords 16, supporting cord 18 around the periphery of the net, a canvas or flexible fabric portion 20 and suitable hooks or the like 22 for supporting the net. The supporting cord 18 is preferably heavier than the crossed cords 16.

The hooks 22 may be of the ordinary screw hook type, whereby they may be screwed into the frame members 14 of the top of the automobile A. The hooks would of course open outwardly with respect to the net.

The cord 18 is adapted to hook into the hooks 22 and a cross cord 24 may also hook into hooks provided therefor for supporting the net at the division between the perforate and the imperforate portions thereof. Notches 26 may be formed in the fabric 20 to accommodate the hooks 22.

Figure 3:
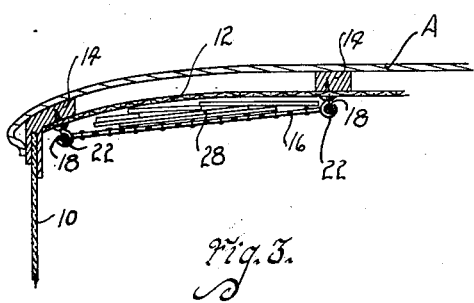
Figure 3 is a cross sectional view on the line 3—3 of Figure 1 illustrating the net in supported relationship with the automobile roof and showing several flat articles supported thereby.

In Figure 3 are shown several flat articles 28 supported in the net. The net is especially desirable for road maps and the like, which can be readily seen through the mesh of the cords 16 and thereby selected before withdrawing them from the net.

Figure 2:
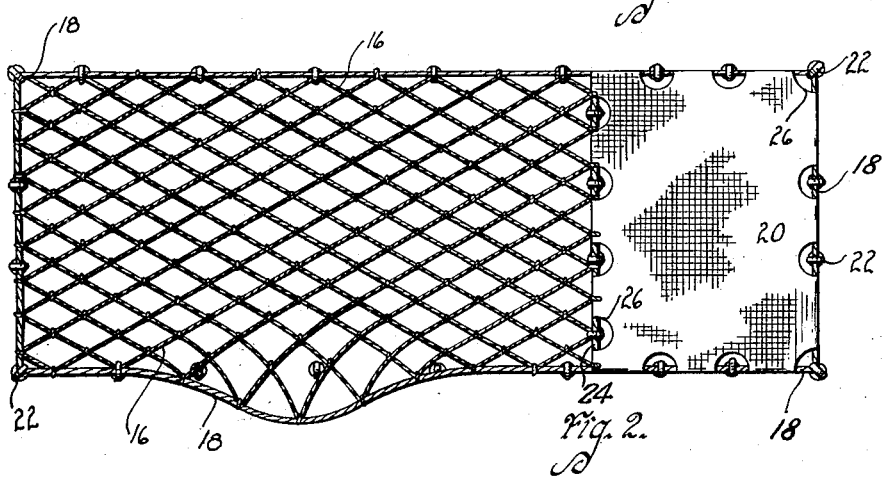
Figure 2 is a bottom plan view of the same illustrating a portion of one edge of the net unhooked and stretched to lowered position for inserting an article in the net.
Figure 4:
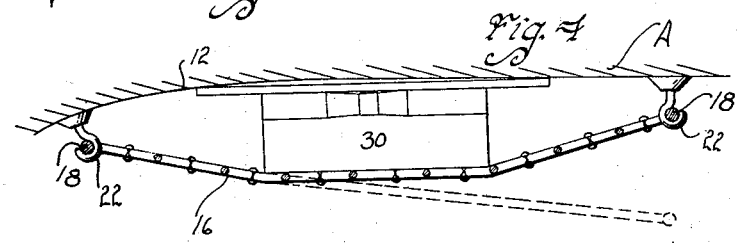
Figure 4 is a somewhat similar sectional view illustrating the shape of the net when supporting bulky articles such as a straw hat.

One of the most important features in the construction of the net is that the crossed cords 16 be arranged diagonally with respect to the rows of hooks 22. This is so that any desired portion of the net may be opened by disengaging a portion of the supporting cord 18 from several of the hooks 22 as shown in Figure 2, which is easily accomplished by stretching the net as shown along the lower side of the figure. Such stretching is most easily done when the cords 16 are arranged diagonally. The net may thus be stretched to a position for accommodating bulky articles as for instance a straw hat 30 as illustrated in Figure 4.

The fabric portion 20 of the net of course cannot be stretched but is made loose enough to allow unhooking of the cord 18 from the hooks 22. The portion 20 is desirable for supporting small articles which would normally fall through the cords 16 or find their way through after vibration caused by the travel of the automobile.

I have shown the hooks 22 merely by way of illustration. Other supporting device could be substituted for the hooks such as hook and eye fasteners or hooks could be attached to the cord 18 and eyes screwed into the frame members 14 or sewed into the fabric 12 of the automobile top. Various other changes could also be made without departing from the real spirit and purpose of my claims, any modified forms of structure or use of mechanical equivalents, which may be reasonably included within their scope.

I claim as my invention:

1. A net of the character disclosed of crossed cord construction and means for supporting said net relative to a surface comprising rows of fastening devices for the edges of the net, each row being arranged at an angle relative to the cords whereby the net may be easily stretched between opposite rows of fastening devices.

2. A net of the character disclosed of flexible crossed and peripheral cord construction and means for supporting said net relative to a surface comprising rows of hooks for the peripheral cord of the net, said peripheral cord being detachable from each of said hooks, each row of hooks being arranged at an angle relative to the cords whereby the net may be easily stretched between opposite rows of hooks.

Des Moines, Iowa, October 5, 1929.

PAUL EMERSON.